(12) United States Patent
Houchens

(10) Patent No.: US 6,303,025 B1
(45) Date of Patent: Oct. 16, 2001

(54) WATER PURIFICATION SYSTEM WITH BAFFLED FLOW

(76) Inventor: Jon E. Houchens, 1738 Prince Philip St., Clearwater, FL (US) 33755

( * ) Notice: Subject to any disclaimer, the term of this patent is extended or adjusted under 35 U.S.C. 154(b) by 0 days.

(21) Appl. No.: 09/506,134

(22) Filed: Feb. 17, 2000

(51) Int. Cl.[7] .................................................. B01D 33/80
(52) U.S. Cl. ..................... 210/104; 210/123; 210/151; 210/209; 210/220; 210/259; 210/320; 210/416.1; 210/521
(58) Field of Search .................................. 210/104, 123, 210/150, 205, 209, 220, 259, 151, 320, 416.1, 521

(56) References Cited

U.S. PATENT DOCUMENTS

| 836,323 | * | 11/1906 | Keegan . |
|---|---|---|---|
| 3,911,938 | * | 10/1975 | Wiltrout . |
| 4,021,347 | * | 5/1977 | Teller et al. . |
| 5,004,537 | * | 4/1991 | Brown . |
| 5,228,995 | * | 7/1993 | Stover . |
| 5,496,469 | * | 3/1996 | Scraggs et al. . |
| 5,503,709 | * | 4/1996 | Burton . |
| 5,647,977 | * | 7/1997 | Arnaud . |
| 5,906,745 | * | 5/1999 | Eto . |

FOREIGN PATENT DOCUMENTS 03-146193 * 6/1991 (JP) .

* cited by examiner

Primary Examiner—Joseph W. Drodge
Assistant Examiner—Terry K. Cecil

(57) ABSTRACT

A water purification system including a rectilinear housing having a plurality of vertical baffles spaced therein. The ends of each of the baffles are located a certain distance below the housing upper edge or above the housing floor to allow for the flow of washwater therethrough from a housing inlet to a housing outlet. A rectilinear array of media, e.g. corrugated plastic, is located between the baffles for harboring bacteria, and an air supply means is provided therebeneath. A feeder mechanism is also provided on an exterior wall of the housing for feeding supplemental bacteria into the housing to make up for bacteria depleted through the operation and use of the system.

5 Claims, 5 Drawing Sheets

WATER PURIFICATION SYSTEM WITH BAFFLED FLOW

BACKGROUND OF THE INVENTION

1. Field of the Invention

The present invention relates to a water purification system and more particularly pertains to recirculating wash water while removing impurities therefrom.

2. Description of the Prior Art

The use of water treatment systems of known designs and configurations is known in the prior art. More specifically, water treatment systems of known designs and configurations previously devised and utilized for the purpose of recirculating water through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 836,323 to J. W. Keegan discloses a process of sewage disposal. U.S. Pat. No. 5,228,995 to Stove discloses a biochemically enhanced hybrid anaerobic reactor. U.S. Pat. No. 5,496,469 to Scraggs, et al. discloses an apparatus for reducing and separating emulsions and homogenous components from contaminated water. U.S. Pat. No. 5,503,709 to Burton discloses an environmentally improved process for preparing recycled lignocellulosic materials for bleaching. U.S. Pat. No. 5,647,977 to Arnaud discloses method and apparatus for removing contaminants from industrial waste water. Lastly, U.S. Pat. No. 5,906,745 to Eto discloses an apparatus and method for purifying polluted water.

While these devices fulfill their respective, particular objectives and requirements, the aforementioned patents do not describe a water purification system that allows recirculating wash water while removing impurities therefrom.

In this respect, the water purification system according to the present invention substantially departs from the conventional concepts and designs of the prior art, and in doing so provides an apparatus primarily developed for the purpose of recirculating wash water while removing impurities therefrom.

Therefore, it can be appreciated that there exists a continuing need for a new and improved water purification system which can be used for recirculating wash water while removing impurities therefrom. In this regard, the present invention substantially fulfills this need.

SUMMARY OF THE INVENTION

In view of the foregoing disadvantages inherent in the known types of water treatment systems of known designs and configurations now present in the prior art, the present invention provides an improved water purification system. As such, the general purpose of the present invention, which will be described subsequently in greater detail, is to provide a new and improved water purification system and method which has all the advantages of the prior art and none of the disadvantages.

To attain this, the present invention essentially comprises a new and improved water purification system for recirculating wash water while removing impurities therefrom. First provided is a housing. The housing is formed in a generally rectilinear configuration. The housing has a rectangular floor and long side walls. The side walls are in parallel relationship with respect to each other. The housing also has a short input end wall and a short output end wall. Each of the walls has an upper edge spaced a common distance above the floor. An inlet line is formed in the input end wall adjacent to the upper edge for water to be purified from a cleaning area. An outlet line is provided adjacent to the floor. A horizontal support plate is formed as an extension of the floor adjacent to the output end wall. A covering is provided over the housing. A plurality of vertical baffles are next provided. The baffles are coupled between the side walls of the housing. Each baffle has an upper edge and a lower edge. The baffles include a first baffle adjacent to the input end wall. The first baffle has a lower edge spaced from the floor and an upper edge spaced a first distance from the upper edge of the housing to allow the flow of water there beneath. A second baffle is included adjacent to the first baffle. The second baffle has a lower edge adjacent to the floor and an upper edge spaced a second distance from the upper edge of the housing greater than the distance of the upper edge of the first baffle to allow the flow of water there over. A third baffle is included adjacent to the second baffle. The third baffle has a lower edge attached to the floor and an upper edge spaced from the upper edge of the housing at a distance substantially equal to that of the first baffle to allow the flow of water there over. The baffles also include a fourth baffle adjacent to the third baffle. The fourth baffle has a lower edge spaced from the floor a distance greater than the first baffle and the third baffle and an upper edge in proximity to the upper edge of the housing to preclude the back flow of water from adjacent to the output end wall toward the input end wall. Lastly, a fifth baffle located between the fourth baffle and the output end wall is provided. The fifth baffle has a lower edge attached to the floor and an upper edge spaced from the upper edge of the housing at a distance substantially equal to that of the first and third baffles. Next provided is a rectilinear array of media, such as corrugated plastic. Media located in the space between the first baffle and the adjacent end wall allows for the flow of water downwardly there through. Media located between the first and second baffles allows for the flow of water upwardly there through. Media located between the second and third baffles allows the flow of water downwardly there through. Bacteria, such as pseudomonas, is next provided. The bacteria is in the housing located on the surface of the media. The bacteria assists in the biological purification of the water flowing there through. Next provided is an air flow system. The air flow system includes an air pump. The air pump is located on the support plate. An associated first air pipe is provided. The first air pipe extends from the pump. A plurality of lateral pipes and aeration heads are provided. The lateral pipes and aeration heads are coupled with respect to the first air pipe and are located in the first chamber, second chamber and third chamber beneath the media and allow for the flow of air through water moving through the media. An overflow is provided so that the water in the treatment chambers is maintained at the correct level. A water flow system is next provided. The water flow system includes a pump. The pump is located above the support plate. A filter is provided. The filter is located on the support plate. A water inlet line is provided to move water from the housing through the pump and then through the filter and then to water outlet connections for final use. Operator controlled handles are provided. The water flow system further includes an arcuate support for a hose located above each outlet connection and an associated reservoir on the support plate to maintain pressure within the water moving through the water flow system. A water inlet orifice is provided in the output end wall. The inlet orifice functions to provide supplemental makeup water to the housing. A float valve is provided. The float valve is located within the housing to allow for the addition of make up water when the water supply within the housing is less than a predetermined level. A control panel is provided. The control panel has a plurality of operator control knobs. The control knobs include a switch for main power, a switch for process pump power, a switch for blower power, and a switch for pressure pump power. A plurality of sensor meters are provided. The sensor meters including an hour meter for process pump operation, an hour meter for blower operation, and an hour meter for process pump operation. Lastly, an associated feeder mechanism is provided. The feeder mechanism is on the exterior surface of the outlet end wall. The feeder mechanism contains a quantity of supplemental bacteria adapted to be fed into the housing as make up for bacteria depleted through the operation and use of the system.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved water purification system which has all of the advantages of the prior art water treatment systems of known designs and configurations and none of the disadvantages.

It is another object of the present invention to provide a new and improved water purification system which may be easily and efficiently manufactured and marketed.

It is further object of the present invention to provide a new and improved water purification system which is of durable and reliable constructions.

An even further object of the present invention is to provide a new and improved water purification system which is susceptible of a low cost of manufacture with regard to both materials and labor, and which accordingly is then susceptible of low prices of sale to the consuming public, thereby making such water purification system economically available to the buying public.

Even still another object of the present invention is to provide a water purification system for recirculating wash water while removing impurities therefrom.

Lastly, it is an object of the present invention to provide a new and improved water purification system. The system includes a housing in a generally rectilinear configuration. The housing has a floor and side walls and an input end wall and an output end wall. Each of the walls have an upper edge. An inlet allows for entry of water to be purified. An outlet line has a support plate. A plurality of vertical baffles include a first baffle having a lower edge spaced from the floor, a second baffle having a lower edge adjacent to the floor and an upper edge spaced from the upper edge of the housing, a third baffle having a lower edge attached to the floor, a fourth baffle spaced from the floor and an upper edge in proximity to the upper edge of the housing, and a fifth baffle having a lower edge attached to the floor. A rectilinear array of media is located in the space between the baffles. Bacteria in the housing is located on the surface of the media. An air flow system includes an air pump with an associated first air pipe extending from the pump with a plurality of lateral pipes and aeration heads coupled with respect thereto located beneath the media for the flow of air. A water flow system includes a pump located above the support plate with a filter on the support plate and a water inlet line to move water from the housing and then to water outlet connections for final use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
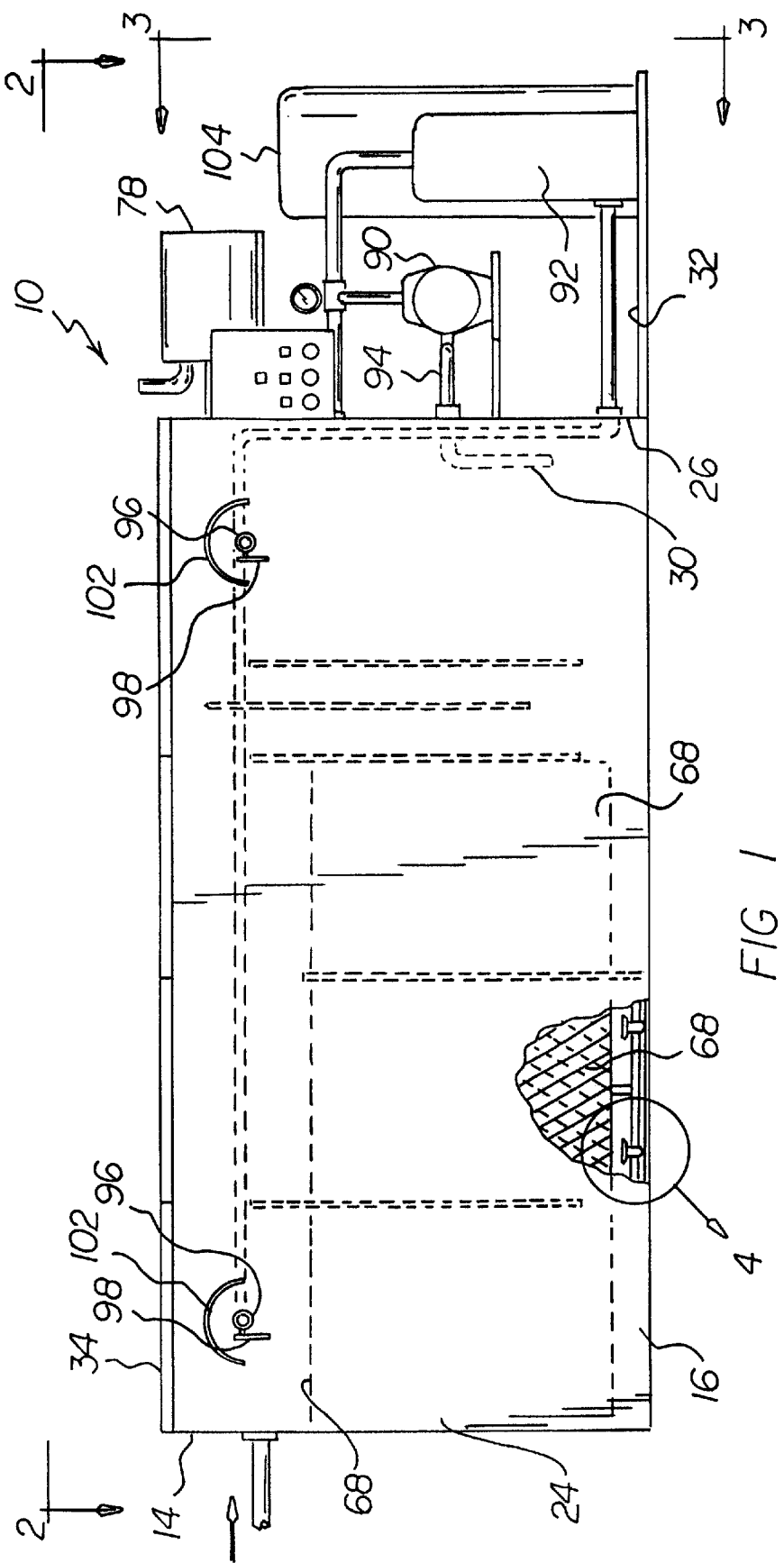
FIG. 1 is a side elevational view of the new and improved water purification system construction in accordance with the principles of the present invention.
Figure 2:
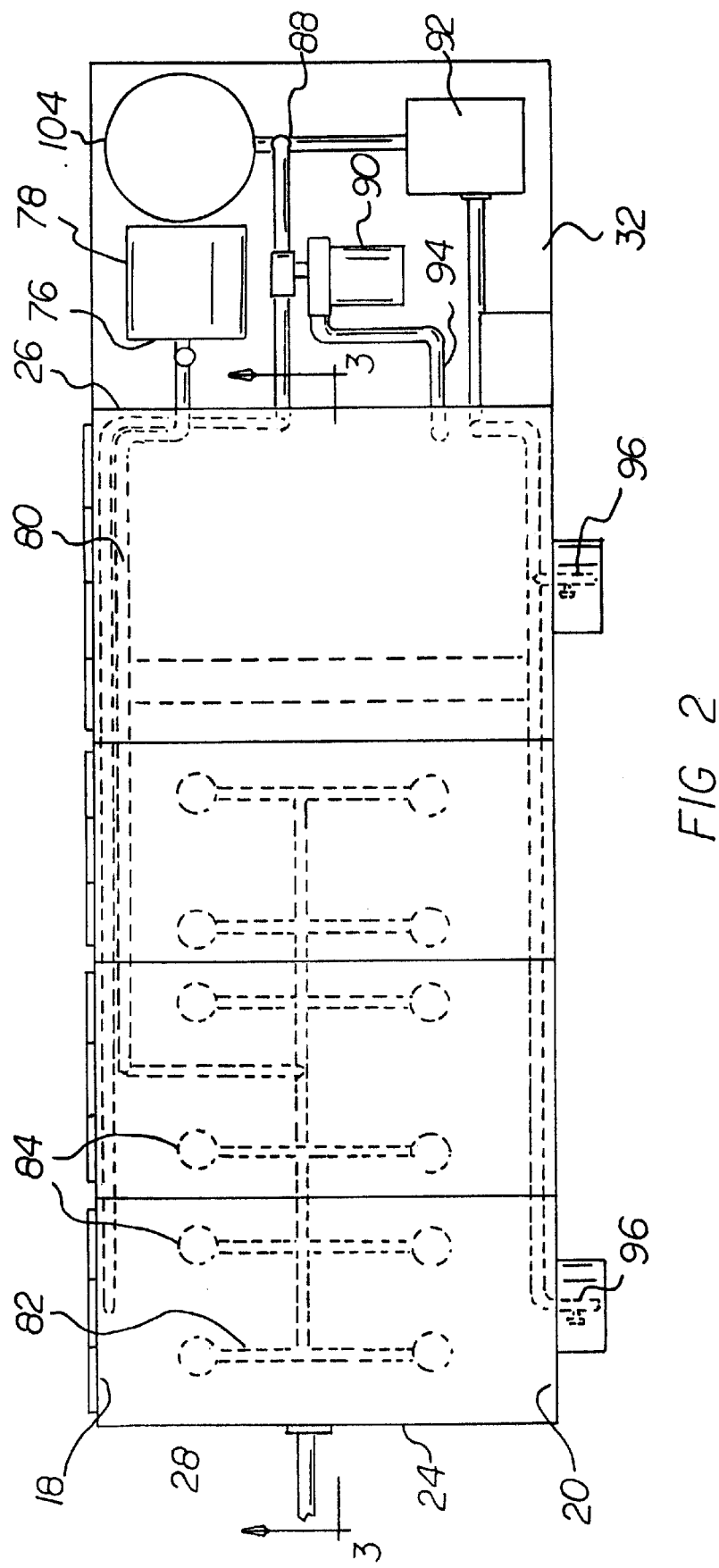
FIG. 2 is a top elevational view taken along line 2—2 of FIG. 1.
Figure 3:
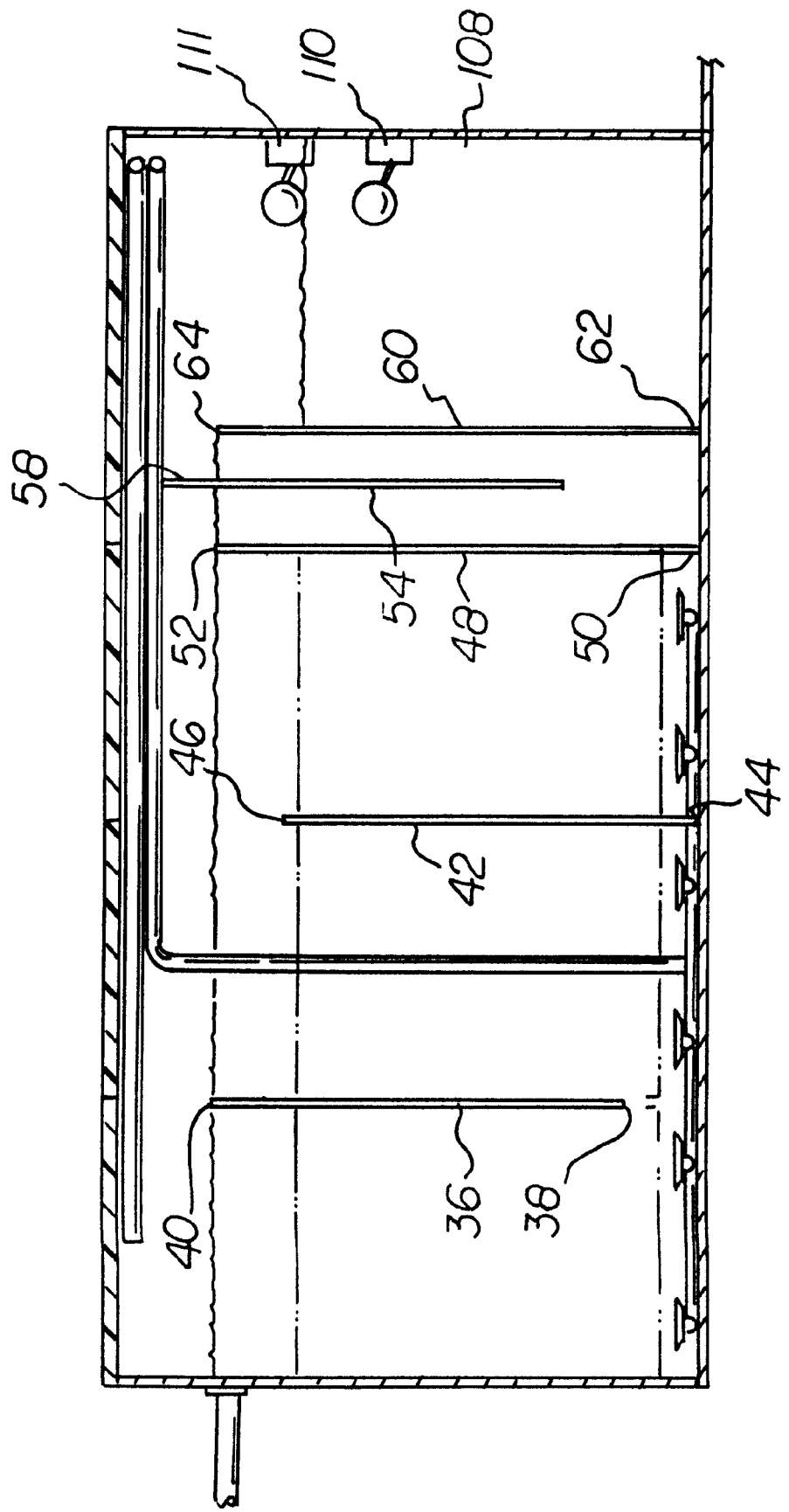
FIG. 3 is a cross sectional view taken through the tank of FIGS. 1 and 2.
Figure 5:
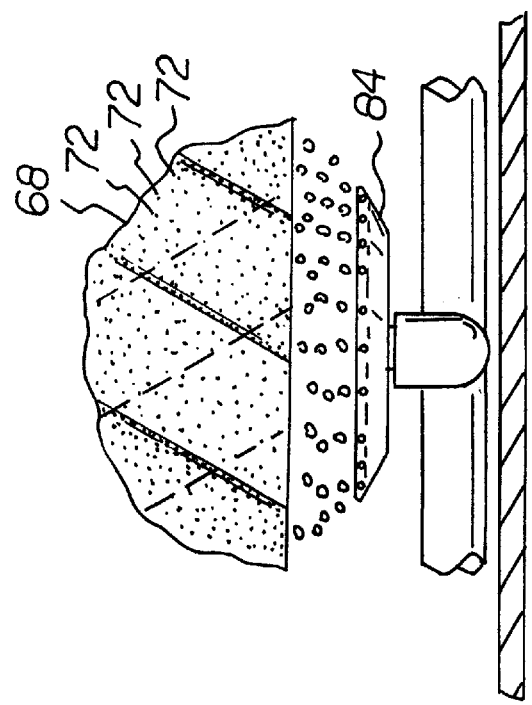
FIG. 5 is an enlarged illustration taken at Circle 4 of FIG. 1.
Figure 4:
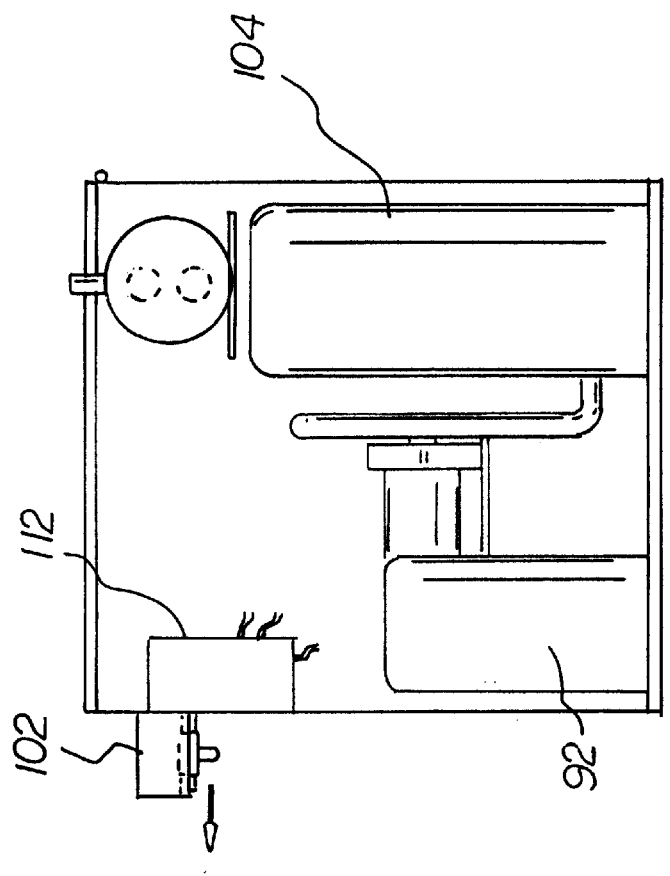
FIG. 4 is an end elevational view taken along line 4—4 of FIG. 1.
Figure 7:
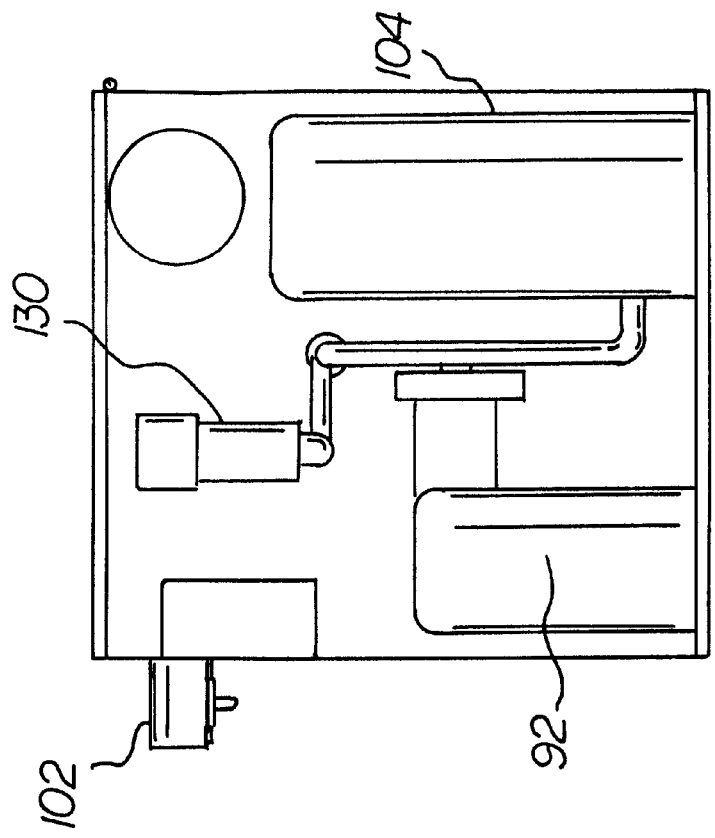
FIG. 7 is illustration of an alternate embodiment of the invention.
Figure 6:
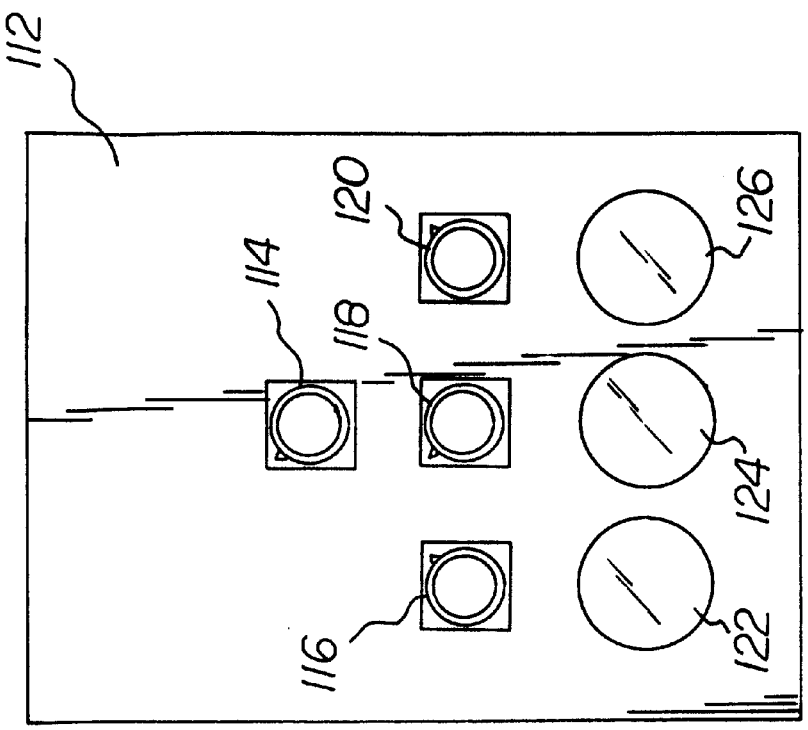
FIG. 6 is an enlarged showing of the control panel of FIG. 1.

With reference now to the drawings, and in particular to FIG. 1 thereof, the preferred embodiment of the new and improved water purification system embodying the principles and concepts of the present invention and generally designated by the reference numeral 10 will be described.

The present invention, the water purification system 10 is comprised of a plurality of components. Such components in their broadest context include a housing, a plurality of vertical baffles, a rectilinear array of media, bacteria, an air flow system, and a water flow system. Such components are individually configured and correlated with respect to each other so as to attain the desired objective.

First provided is a housing 14. The housing is formed in a generally rectilinear configuration. The housing has a rectangular floor 16 and long side walls 18, 20. The side walls are in parallel relationship with respect to each other. The housing also has a short input end wall 22 and a short output end wall 24. Each of the walls has an upper edge 26 spaced a common distance above the floor. An inlet line 28 is formed in the input end wall adjacent to the upper edge for water to be purified from a cleaning area. An outlet line 30 is provided adjacent to the floor. A horizontal support plate 32 is formed as an extension of the floor adjacent to the output end wall. A covering 34 is provided over the housing.

A plurality of vertical baffles are next provided. The baffles are coupled between the side walls of the housing. Each baffle has an upper edge and a lower edge. The baffles include a first baffle 36 adjacent to the input end wall. The first baffle has a lower edge 38 spaced from the floor and an upper edge 40 spaced a first distance from the upper edge of the housing to allow the flow of water there beneath. A second baffle 42 is included adjacent to the first baffle. The second baffle has a lower edge 44 adjacent to the floor and an upper edge 46 spaced a second distance from the upper edge of the housing greater than the distance of the upper edge of the first baffle to allow the flow of water there over. A third baffle 48 is included adjacent to the second baffle. The third baffle has a lower edge 50 attached to the floor. An upper edge 52 is spaced from the upper edge of the housing at a distance substantially equal to that of the first baffle to allow the flow of water there over. The baffles also include a fourth baffle 54 adjacent to the third baffle. The fourth baffle has a lower edge 56 spaced from the floor a distance greater than the first baffle and the third baffle and an upper edge 58 in proximity to the upper edge of the housing to preclude the back flow of water from adjacent to the output end wall toward the input end wall. Lastly, a fifth baffle 60 located between the fourth baffle and the output end wall is provided. The fifth baffle has a lower edge 62 attached to the floor and an upper edge 64 spaced from the upper edge of the housing at a distance substantially equal to that of the first and third baffles.

Next provided is a rectilinear array of media 68, such as a corrugated plastic. Media located in the space between the first baffle and the adjacent end wall allows for the flow of water downwardly there through. A preferred media is that manufactured and sold by Trans Chem Industries of Atlanta, Ga., under the trade name Waste Buster. Another is that as described as component 58 of U.S. Pat. No. 5,496,469 to Scraggs et al., the subject matter of which is incorporated herein by reference. Media located between the first and second baffles allows for the flow of water upwardly there through. Media located between the second and third baffles allows the flow of water downwardly there through.

Bacteria 72, such as pseudomonas, is next provided. The bacteria is in the housing located on the surface of the media. The bacteria assists in the biological purification of the water flowing there through.

Next provided is an air flow system 76. The air flow system includes an air pump 78. The air pump is located on the support plate. An associated first air pipe 80 is provided. The first air pipe extends from the pump. A plurality of lateral pipes 82 and aeration heads 84 are provided. The lateral pipes and aeration heads are coupled with respect to the first air pipe and are located in the first chamber, second chamber and third chamber beneath the media and allow for the flow of air through water moving through the media.

A water flow system 88 is next provided. The water flow system includes a pump 90. The pump is located above the support plate. A filter 92 is provided. The filter is located on the support plate. A water inlet line 94 is provided to move water from the housing through the pump and then through the filter and then to water outlet connections 96 for final use. Operator controlled handles 98 are provided. The water flow system further includes an arcuate support 102 for a hose located above each outlet connection and an associated reservoir 104 on the support plate to maintain pressure within the water moving through the water flow system.

A water inlet orifice 108 is provided in the output end wall. The inlet orifice functions to provide supplemental makeup water to the housing. A float valve 110 is provided. The float valve is located within the housing to allow for the addition of make up water when the water supply within the housing is less than a predetermined level. An overflow protector with a float 111 is provided so that the water in the treatment chambers is maintained at a correct level.

A control panel 112 is provided. The control panel has a plurality of operator control knobs. The control knobs include a switch for main power 114, a switch for process pump power 116, a switch for blower power 118, and a switch for pressure pump power 120. A plurality of sensor meters are provided. The sensor meters including an hour meter for process pump operation 122, an hour meter for blower operation 124, and an hour meter for process pump operation 126.

Lastly, an associated feeder mechanism 130 is provided. The feeder mechanism is on the exterior surface of the outlet end wall. The feeder mechanism contains a quantity of supplemental bacteria adapted to be fed into the housing as make up for bacteria depleted through the operation and use of the system.

The system is a fixed-film biological treatment system. The system utilizes specialty engineered microbial blends for the breakdown of contaminants. The system breaks down organic contaminants (oil, grease, gasoline, diesel, herbicides and pesticides) into carbon dioxide and water. The system controls odor through an oxygen rich water not allowing the system to go septic. The system produces a clear and odorless water for reuse.

Waste or wash water is delivered to the treatment system from a collection sump via a submersible pump. Primary treatment is performed in the three stage bioreactor. The bioreactors are constructed so that the waste stream travels up and down through he tank to prevent "short circuiting". The media used for "good" bacteria colony growth maximizes the area of bioreactors. Using the fixed-film bacteria increases the capacity of the bioreactor 10-fold. The fixed-film or attached microbial system allows longer contact time between the microbes and the contaminant. The increased surface area also creates a longer path for the air to flow, creating a smaller bubble and improved oxygen transfer. Treated water is brought back for reuse with hose connections on the side of the treatment system. Hose hangers are used to provide a complete package system. The clarifier allows adequate time for any solids to settle out of the water. A liquid level float is used to maintain a constant waster level throughout the system. water levels do get low with evaporation and drive-off water. The blower continuously operates to oxygenate the wastewater. This creates an ideal environment for the colony of "good" bacteria. By creating the ideal environment for biological growth, digestion of organic contaminants is greatly increased. The pressure pump delivers 25 gpm at 50 psi of treated wash water for use. the recycled water is also delivered back to the bioreactors for continuous treatment. A pressurized bladder tank is utilized to provide a buffer for the pressure pump. This tank ensures that a constant pressure and flow is available for recycling while taking the strain off of the pump. A polyscreen particle filter is used to remove any particulate form the treated waste stream. This filter is reusable.

The system according to the present invention can be used in a variety of application, such as, in the auto parts recycling business for parts cleaning/degreasing, in golf cart cleaning and maintenance, to wash and degrease road construction equipment and fleet vehicles, in poultry processing, and countless other applications.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A water purification system for recirculating wash water while removing impurities therefrom comprising, in combination:

a housing in a generally rectilinear configuration having a rectangular floors, long side walls in parallel relationship with respect to each other, wall, a short output end wall, an inlet line for water to be purified from a cleaning area formed in the input end wall adjacent to the upper edge, and an outlet line adjacent to the floor with a horizontal support plate formed as an extension of the floor adjacent to the output end wall and a covering thereover, each of the walls having an upper edge spaced a common distance above the floor to define a housing upper edge;

a plurality of vertical baffles coupled between the side walls of the housing each with an upper edge and a lower edge and including a first baffle adjacent to the input end wall and having a lower edge spaced from the floor and an upper edge spaced a first distance from the upper edge of the housing to allow the flow of water therebeneath, a second baffle adjacent to the first baffle and having a lower edge adjacent to the floor and an upper edge spaced a second distance from the upper edge of the housing greater than the distance of the upper edge of the first baffle to allow the flow of water thereover, a third baffle adjacent to the second baffle and having a lower edge attached to the floor and an upper edge spaced from the upper edge of the housing at a distance substantially equal to that of the first baffle to allow the flow of water thereover, a fourth baffle adjacent to the third baffle and having a lower edge spaced from the floor a distance greater than the first baffle and the third baffle and an upper edge in proximity to the upper edge of the housing to preclude the back flow of water from adjacent to the output end wall toward the input end wall, and a fifth baffle between the fourth baffle and the output end wall and having a lower edge attached to the floor and an upper edge spaced from the upper edge of the housing at a distance substantially equal to that of the first and third baffles;

a rectilinear array of media, comprising corrugated plastic, for the flow of water downwardly therethrough located in the space between the first baffle and the adjacent end wall and between the first and second baffles for the flow of water upwardly therethrough, and between the second and third baffles for the flow of water downwardly therethrough;

bacteria, comprising pseudomonas, in the housing and located on the surface of the media to assist in the biological purification of the water flowing therethrough;

an air flow system including an air pump located on the support plate with an associated first air pipe extending from the pump with a plurality of lateral pipes and aeration heads coupled with respect thereto located in a first chamber upstream of the first baffle, a second chamber between the first baffle and the second baffle and a third chamber between the second baffle and the third baffle beneath the media for the flow of air through water moving through the media;

a water flow system including a pump located above the support plate with a filter on the support plate and a water inlet line to move water from the housing through the pump and then through the filter and then to water outlet connections with operator-controlled handles for final use, the water flow system further including an arcuate support for a hose located above each outlet connection and an associated reservoir on the support plate to maintain pressure within the water moving through the water flow system;

a water inlet orifice in the output end wall to provide supplemental makeup water to the housing with a float valve located within the housing to allow for the addition of make-up water when the water supply within the housing is less than a predetermined level; and a control panel with a plurality of operator control knobs including a switch for main power, a switch for process pump power, a switch for blower power, and a switch for pressure pump power with a plurality of sensor meters including an hour meter for process pump operation, and an hour meter for blower operation.

2. The system as set forth in claim 1 and further including an associated feeder mechanism on the exterior surface of the outlet end wall containing a quantity of supplemental bacteria adapted to be fed into the housing as make up for bacteria depleted through the operation and use of the system.

3. A water purification system comprising:

a housing in a generally rectilinear configuration having a floor, side walls, an input wall, an output end wall, an inlet line for water to be purified, an outlet line, and with a support plate beneath the housing, each of the walls having an upper edge defining a housing upper edge;

a plurality of vertical baffles including a first baffle having a lower edge spaced from the floor, a second baffle having a lower edge adjacent to the floor and an upper edge spaced from the upper edge of the housing, a third baffle having a lower edge attached to the floor, a fourth baffle spaced from the floor and an upper edge in proximity to the upper edge of the housing, and a fifth baffle having a lower edge attached to the floor;

a rectilinear array of media located in the space between the baffles;

bacteria in the housing located on the surface of the media;

an air flow system including an air pump with an associated first air pipe extending from the pump with a plurality of lateral pipes and aeration heads coupled with respect thereto located beneath the media for the flow of air;

a water flow system including a pump located above the support plate with a filter on the support plate and a water inlet line to move water from the housing and then to water outlet connections for final use; and an associated feeder mechanism on the exterior surface of the outlet end wall containing a quantity of supplemental bacteria adapted to be fed into the housing as make up for bacteria depleted through the operation and use of the system.

4. The system as set forth in claim 3 and further including a water inlet orifice in the output end wall to provide supplemental makeup water to the housing with a float valve located within the housing to allow for the addition of make up water when the water supply within the housing is less than a predetermined level.

5. The system as set forth in claim 3 and further including a control panel with a plurality of operator control knobs including a switch for main power, a switch for process pump power, a switch for blower power, and a switch for pressure pump power with a plurality of sensor meters including an hour meter for process pump operation, and an hour meter for blower operation.

* * * * *